(12) United States Patent
Gu et al.

(10) Patent No.: US 12,370,776 B2
(45) Date of Patent: *Jul. 29, 2025

(54) DISPLAY DEVICE

(71) Applicant: Samsung Display Co., Ltd., Yongin-Si (KR)

(72) Inventors: Dasom Gu, Changwon-si (KR); Hirotsugu Kishimoto, Hwaseong-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 258 days.

This patent is subject to a terminal disclaimer.

(21) Appl. No.: 17/212,308

(22) Filed: Mar. 25, 2021

(65) Prior Publication Data

US 2022/0009200 A1 Jan. 13, 2022

(30) Foreign Application Priority Data

Jul. 9, 2020 (KR) .................. 10-2020-0084581

(51) Int. Cl.
*B32B 7/12* (2006.01)
*B32B 17/06* (2006.01)
(Continued)

(52) U.S. Cl.
CPC .............. *B32B 7/12* (2013.01); *B32B 17/06* (2013.01); *B32B 27/06* (2013.01); *G06F 1/1652* (2013.01); *H04M 1/0214* (2013.01); *B32B 2307/42* (2013.01); *B32B 2307/50* (2013.01); *B32B 2307/732* (2013.01); *B32B 2457/20* (2013.01); *H04M 1/0268* (2013.01)

(58) Field of Classification Search
CPC ........ H04M 1/0268; G09F 9/301; B32B 7/12; B32B 2457/20; B32B 2307/50; G06F 1/1618; G06F 1/1652
See application file for complete search history.

(56) References Cited

U.S. PATENT DOCUMENTS 9,868,880 B2 1/2018 Jeong et al.
11,329,250 B2 * 5/2022 Song .................. G09F 9/301
(Continued)

FOREIGN PATENT DOCUMENTS

CN 101600771 A 12/2009
CN 104673112 A 6/2015
(Continued)

OTHER PUBLICATIONS

Machine translation of KR20190030912A, published Mar. 2019, Powered by EPO and Google. (Year: 2019).*
(Continued)

*Primary Examiner* — Monique R Jackson
(74) *Attorney, Agent, or Firm* — CANTOR COLBURN LLP

(57) ABSTRACT

A display device includes a display panel which is foldable with respect to at least one folding axis, a first adhesive layer disposed on the display panel, and a window disposed on the first adhesive layer. The first adhesive layer has a storage modulus of about 1.8 MPa to about 4.0 MPa at room temperature, and particularly at 30000 Hertz (Hz) when the window comprises a polymer film or at 50000 Hz when the window comprises a glass substrate.

9 Claims, 7 Drawing Sheets

(51) Int. Cl.
  *B32B 27/06* (2006.01)
  *G06F 1/16* (2006.01)
  *H04M 1/02* (2006.01)

(56) References Cited

U.S. PATENT DOCUMENTS

| | | | |
|---|---|---|---|
| 2007/0247697 A1* | 10/2007 | Sohn | G02F 1/133305 359/245 |
| 2010/0182679 A1 | 7/2010 | Han et al. | |
| 2015/0010766 A1* | 1/2015 | Hwang | B32B 37/223 525/217 |
| 2017/0031074 A1* | 2/2017 | Kong | G02B 5/3083 |
| 2017/0200915 A1* | 7/2017 | Lee | H10K 59/40 |
| 2018/0258332 A1 | 9/2018 | Song et al. | |
| 2018/0346774 A1 | 12/2018 | Chen et al. | |
| 2021/0036259 A1* | 2/2021 | Song | G09F 9/301 |
| 2021/0107265 A1* | 4/2021 | Hirata | B32B 5/20 |

FOREIGN PATENT DOCUMENTS

| | | | | |
|---|---|---|---|---|
| CN | 108026428 A | | 5/2018 | |
| CN | 110418716 A | | 11/2019 | |
| JP | 2013186216 A | | 9/2013 | |
| JP | WO2012173247 A1 | | 2/2015 | |
| JP | 2017095655 A | * | 6/2017 | ............ C09J 11/06 |
| KR | 1020160083583 A | | 7/2016 | |
| KR | 101806355 B1 | | 12/2017 | |
| KR | 101835022 B1 | | 3/2018 | |
| KR | 101922646 B1 | | 11/2018 | |
| KR | 1020190030912 A | * | 3/2019 | |
| KR | 1020190098435 A | | 8/2019 | |
| KR | 102030032 B1 | | 11/2019 | |
| KR | 102069481 B1 | | 1/2020 | |

OTHER PUBLICATIONS

Machine translation of JP2017095655A, published Jun. 2017, Powered by EPO and Google. (Year: 2017).*

Pittenger, Nanoscale DMA with the Atomic Force Microscope: A New Method for Measuring Viscoelastic Properties of Nanostructured Polymer Materials, 2019, JOM, vol. 71, No. 10, pp. 3390-3398. (Year: 2019).*

García-Barruetabeña, Experimental characterization and modelization of the relaxation and complex moduli of a flexible adhesive, 2011, Materials and Design, vol. 32, pp. 2783-2798. (Year: 2011).*

Taghizadeh, Rheological and Adhesion Properties of Acrylic Pressure-Sensitive Adhesives, 2010, Journal of Applied Polymer Science, vol. 120, pp. 411-418. (Year: 2010).*

Abrahamson (2019) Optically Clear Adhesives for OLED. Luminescence—OLED Technology and Applications. 2020. IntechOpen. Available at: http://dx.doi.org/10.5772/intechopen.88659. Attached version copied from https://www.intechopen.com/chapters/68746 with ads deleted (Year: 2019).*

Lee (2019) Pressure-Sensitive Adhesives for Flexible Display Applications. Hybrid Nanomaterials—Flexible Electronics Materials. 2020. IntechOpen. Available at: http://dx.doi.org/10.5772/intechopen.90619. Attached version copied from https://www.intechopen.com/chapters/70587 with ads deleted (Year: 2019).*

* cited by examiner

DISPLAY DEVICE

This application claims priority to Korean Patent Application No. 10-2020-0084581, filed on Jul. 9, 2020, and all the benefits accruing therefrom under 35 U.S.C. § 119, the content of which in its entirety is herein incorporated by reference.

BACKGROUND

The present disclosure herein relates to a display device, and more particularly, to a foldable display device including an adhesive layer disposed between a display panel and a window.

A display device displays various images on a display screen to provide information to users. Typically, the display device displays information within an allotted screen. A flexible display device including a flexible display panel that is foldable or bendable is being developed. The flexible display device, unlike a rigid display device, is foldable, rollable, or bendable. The flexible display device that is deformable into various shapes is portable without being limited to an existing screen size, thereby enhancing user friendliness.

An adhesive layer applied to the flexible display device is required to keep reliability against repeated folding or bending, and to ensure impact resistance.

SUMMARY

The present disclosure provides a display device capable of keeping reliability against repeated folding and unfolding, and having improved impact resistance.

An embodiment of the inventive concept provides a display device including a display panel which is foldable with respect to at least one folding axis, a window disposed on the display panel, and a first adhesive layer disposed between the display panel and the window, where the first adhesive layer has a storage modulus of about 1.8 megapascals (MPa) to about 4.0 MPa at room temperature.

The first adhesive layer may have a storage modulus of about 0.2 MPa or less at −20 degrees in Celsius (° C.), and have the maximum value of a loss factor (tan δ) at a frequency of about 1000 Hertz (Hz) or greater.

The window may include a polymer film, and the storage modulus of the first adhesive layer may be the value of about 1.8 MPa to about 4.0 MPa at 30000 Hz.

The window may include a polymer film, and the loss factor (tan δ) of the first adhesive layer at 30000 Hz may be about 1.6 or greater.

The window may include a glass substrate, and the storage modulus of the first adhesive layer may be the value of about 1.8 MPa to about 4.0 MPa at 50000 Hz.

The window may include a glass substrate, and the loss factor (tan δ) of the first adhesive layer at 50000 Hz may be about 1.5 or greater.

The display device may further include a polarizing film disposed between the first adhesive layer and the display panel, and a second adhesive layer having a storage modulus of about 0.2 MPa or less at −20° C. and disposed between the polarizing film and the display panel.

The second adhesive layer may have the maximum value of the loss factor (tan δ) at a frequency of about 1000 Hz or greater.

The window may include a polymer film, and the second adhesive layer may have a storage modulus of about 0.8 MPa to about 2.0 MPa at 10000 Hz.

The window may include a polymer film, and the loss factor (tan δ) of the second adhesive layer at 10000 Hz may be about 1.5 or greater.

The window may include a glass substrate, and the second adhesive layer may have a storage modulus of about 1.8 MPa to about 4.0 MPa at 40000 Hz.

The window may include a glass substrate, and the loss factor (tan δ) of the second adhesive layer at 40000 Hz may be about 1.5 or greater.

The first adhesive layer may have a thickness of about 75 micrometers (μm) to about 150 μm.

The window may have a thickness being greater than about 0 μm and equal to or less than about 100 μm.

The display panel and the window may be folded to have a radius of curvature of about 1 millimeters (mm) to about 5 mm with respect to the at least one folding axis.

The window may include at least one polymer resin among polyethylene terephthalate, polybutylene terephthalate, polyethylene naphthalene, polycarbonate, polymethylmethaclate, polystyrene, polyvinyl chloride, polyethersulfone, polypropylene, polyamide, polyphenylene ether, polyoxymethylene, polysulfone, polyphenylene sulfide, polyimide, polyethyleneimine, polyetheretherketone, polyamideimide, polyarylate, and thermoplastic polyurethane.

In an embodiment of the inventive concept, a display device includes a display panel which is foldable with respect to at least one folding axis, a polarizing film on the display panel, a window disposed on the polarizing film, a first adhesive layer disposed between the polarizing film and the window, and a second adhesive layer disposed between the display panel and the polarizing film, wherein the first adhesive layer has a storage modulus of about 1.8 MPa to about 4.0 MPa at room temperature, and the second adhesive layer has a storage modulus of about 0.8 MPa to about 2.0 MPa, or about 1.8 MPa to about 4.0 MPa at the room temperature.

Each of the first adhesive layer and the second adhesive layer may have a storage modulus of about 0.2 MPa or less at −20° C., and have the maximum value of the loss factor (tan δ) at a frequency of about 1000 Hz or greater.

The window may be a polymer film, the storage modulus of the first adhesive layer may be the value of about 1.8 MPa to about 4.0 MPa at 30000 Hz, and the storage modulus of the second adhesive layer at 10000 Hz may be about 0.8 MPa to about 2.0 MPa.

The window may be a glass substrate, the storage modulus of the first adhesive layer may be the value of about 1.8 MPa to about 4.0 MPa at 50000 Hz, and the storage modulus of the second adhesive layer at 40000 Hz may be about 1.8 MPa to about 4.0 MPa.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
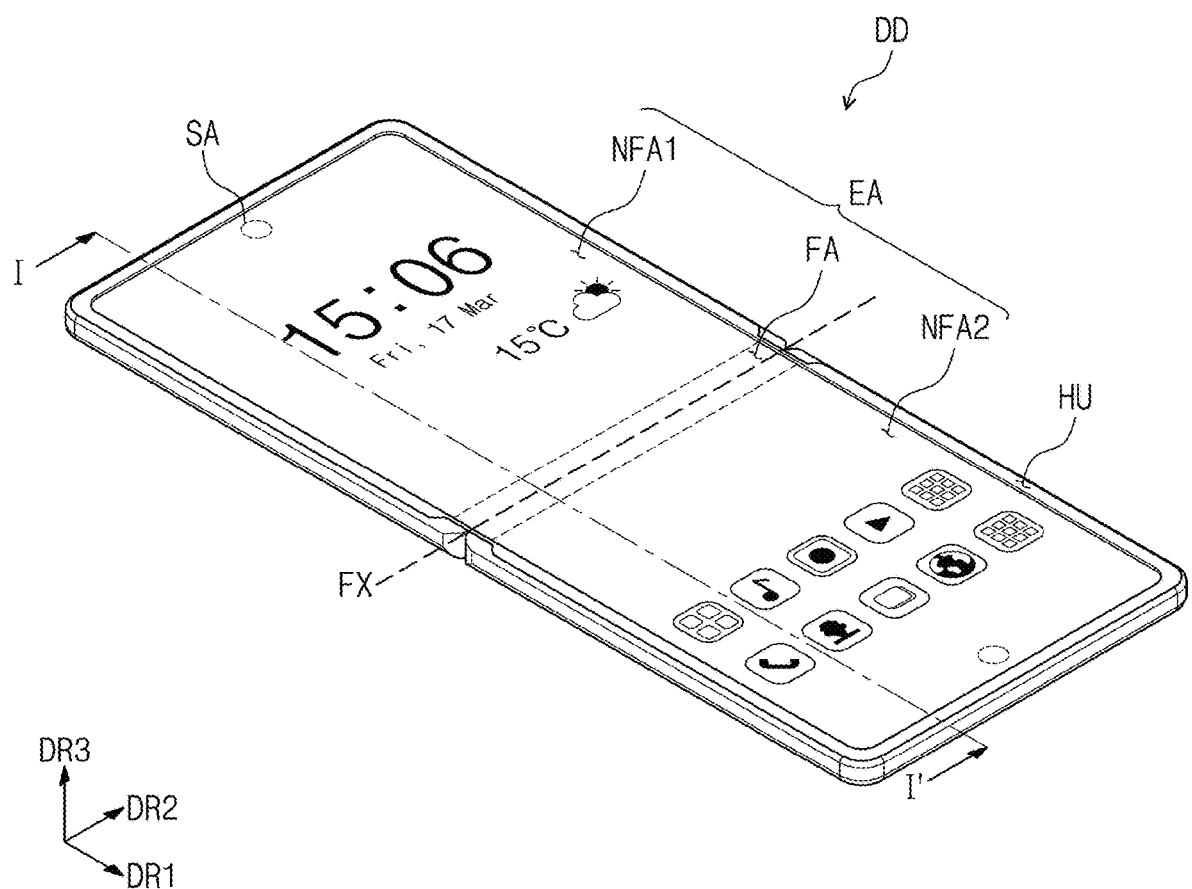
FIG. 1 is a perspective view illustrating a display device of an embodiment.

The present disclosure may be modified in many alternate forms, and thus specific embodiments will be exemplified in the drawings and described in detail. It should be understood, however, that it is not intended to limit the inventive concept to the particular forms disclosed, but rather, is intended to cover all modifications, equivalents, and alternatives falling within the spirit and technical scope of the invention concept.

In the present description, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, a display device according to an embodiment of the inventive concept will be described with reference to the accompanying drawings.

Figure 2:
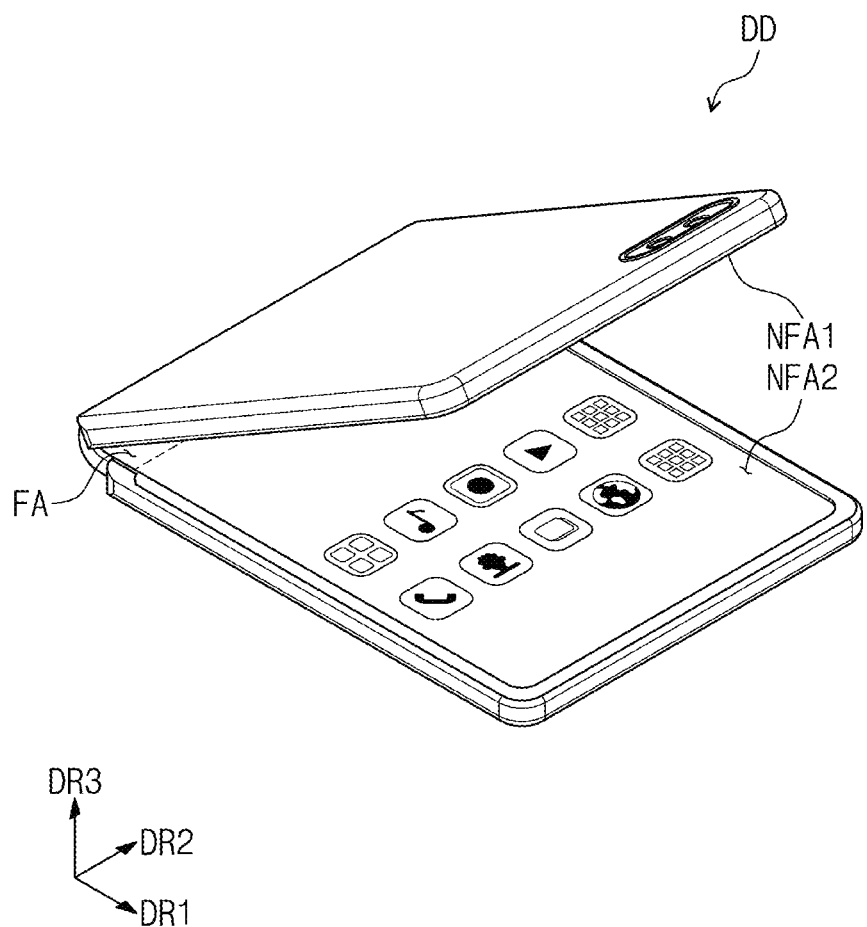
FIG. 2 is a perspective view illustrating a display device of an embodiment.

FIGS. 1 and 2 are perspective views illustrating a display device DD of an embodiment. FIG. 1 illustrates a display device DD in an unfolded state, and FIG. 2 illustrates a display device DD in a folded state. The display device DD according to an embodiment may be a flexible display device that is foldable or bendable, or that may keep a folded or bent state.

Referring to FIGS. 1 and 2, the display device DD may be a device activated according to electrical signals. For example, the display device DD may be a personal digital terminal, a tablet, a car navigation unit, a game console, or a wearable device, but is not limited thereto. FIGS. 1 and 2 exemplarily illustrate that the display device DD is a portable electronic device.

The display device DD may display an image through an active region EA. The active region EA may include non-folding regions NFA1 and NFA2, and a folding region FA. The folding region FA may be bendable with respect to a folding axis FX extended in a second directional axis DR2. Display devices DD and DD-a of an embodiment include a display panel DP and a window WD disposed on the display panel DP, and the display panel DP may be foldable with respect to at least one folding axis. The display panel DP and the window WD may be folded to have a radius of curvature of about 1 millimeters (mm) to about 5 mm with respect to the folding axis FX. The display panel DP and the window WD will be described later in more detail with reference to FIGS. 3 and 4.

When the display devices DD is folded, the non-folding regions NFA1 and NFA2 may face each other. In a fully folded state, the active region EA may not be exposed to the outside, which may be referred to as "in-folding". (Refer to FIG. 2.) However, this is presented as an example, and the operation of the display devices DD according to the invention is not limited thereto. In another embodiment, in a fully folded state, the active region EA may be exposed to the outside, which may be referred to as "out-folding".

The display device DD may be capable of performing only any one of in-folding or out-folding. Alternatively, the display device DD may be capable of performing both in-folding and out-folding. In this case, the same region of the display device DD, for example, the folding region FA may be in-folded and out-folded. Alternatively, some regions of the display device DD may be in-folded, and some other regions may be out-folded.

FIGS. 1 and 2 illustrate that the display device DD includes one folding region FA and two non-folding regions NFA1 and NFA2, but the number of folding and non-folding regions according to the invention is not limited thereto. In another embodiment, for example, a display device may include three or more non-folding regions and two or more folding regions disposed between adjacent non-folding regions.

FIGS. 1 and 2 illustrate that the folding axis FX is parallel to a minor axis (i.e., latitudinal axis) of the display device DD, that is, a direction in which the second directional axis DR2 extends. However, this is presented as an example, and the embodiment of the inventive concept is not limited thereto. In another embodiment, for example, the folding axis FX may be parallel to a major axis (i.e., longitudinal axis) of the display device DD, that is, a direction in which the first directional axis DR1 extends.

The display device DD may include a sensing region SA surrounded by the active region EA. For example, the sensing region SA may overlap a camera module in a plan view (i.e., view in a direction in which the third directional axis DR3 extends). FIG. 1 illustrates one sensing region SA, but the embodiment of the inventive concept is not limited thereto. A display device of an embodiment may include a plurality of sensing regions in another embodiment.

The display device DD may include a case HU. The case HU may accommodate a display panel DP and a window WD (which will be described later).

FIGS. 1 and 2 illustrate that the display device DD of an embodiment is a foldable display device, but the embodiment of the inventive concept is not limited thereto. A display device according to an embodiment may be a flexible display device that is foldable or bendable, or that may keep a folded or bent state. In the present description, the term "flexible" refers to a property of being bendable, and is not limited to a structure that is bent to be fully folded, and may include a structure that is bent up to a level of a few nanometers (nm).

Figure 3:
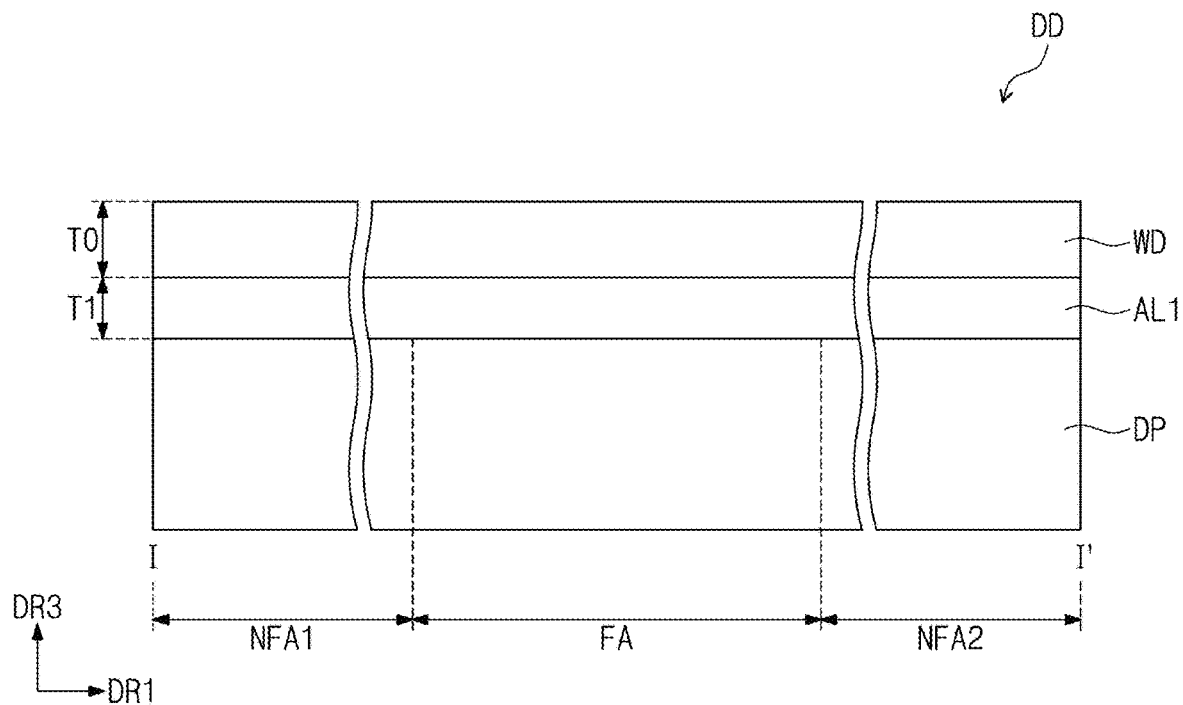
FIG. 3 is a cross-sectional view illustrating a portion corresponding to line I-I' of FIG. 1.
Figure 4:
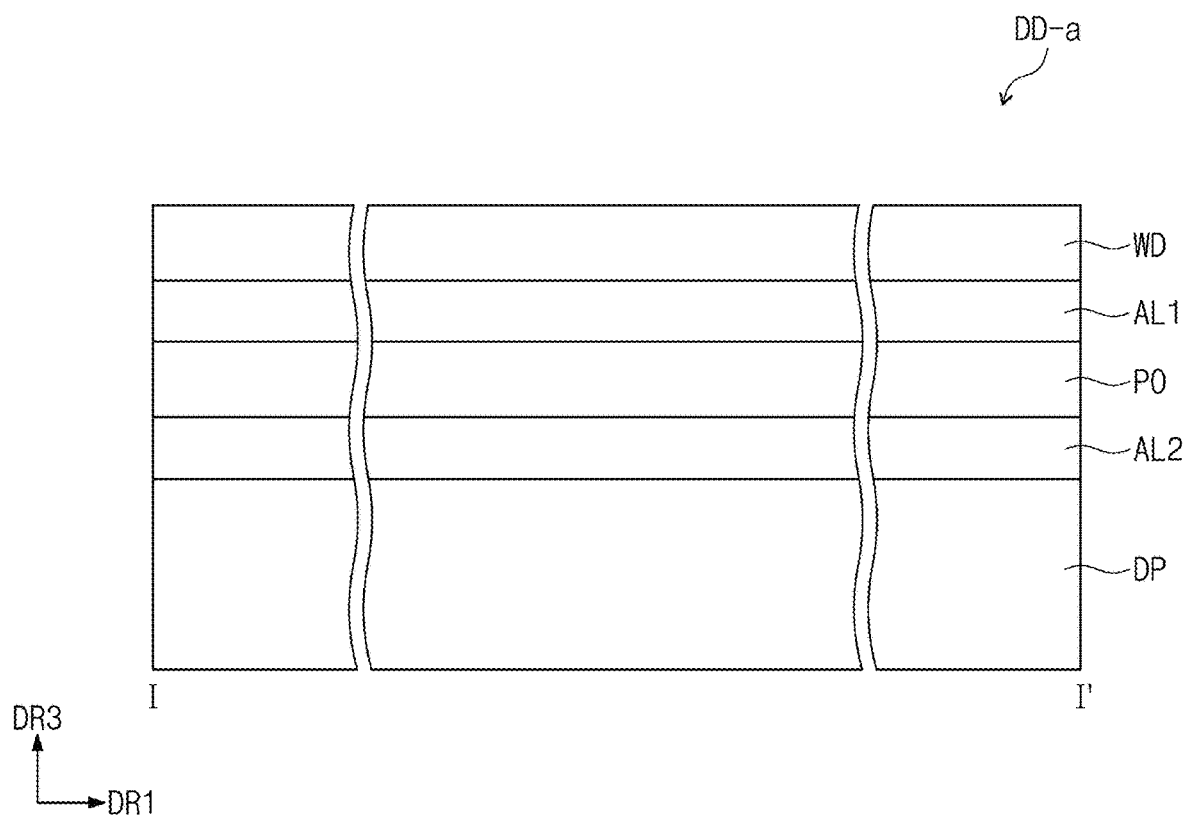
FIG. 4 is a cross-sectional view illustrating a display device according to an embodiment.

FIG. 3 is a cross-sectional view taken along line I-I' of FIG. 1. FIG. 4 is a cross-sectional view illustrating another embodiment of a display device DD-a of the inventive concept. FIG. 4, compared to FIG. 3, illustrates that a polarizing film PO disposed below a first adhesive layer AL1, and a second adhesive layer AL2 disposed below the polarizing film PO are further included.

The display devices DD and DD-a of an embodiment may include a display panel DP, a first adhesive layer AL1 disposed on the display panel DP, and a window WD disposed on the first adhesive layer AL1. In addition, the display device DD-a of an embodiment may further include a polarizing film PO disposed on the display panel DP, and a second adhesive layer AL2 disposed between the polarizing film PO and display panel DP. The first adhesive layer AL1 and the second adhesive layer AL2 each may be a pressure sensitive adhesive ("PSA") layer. The first adhesive layer AL1 and the second adhesive layer AL2 of an embodiment each may include a viscoelastic material.

According to an embodiment, the window WD may include a polymer film or a glass substrate. The window WD may include a polymer film. For example, the window WD may include at least one polymer resin among polyethylene terephthalte ("PET"), polybutylene terephthalate ("PBT"), polyethylene naphthalene ("PEN"), polycarbonate ("PC"), poly(methylmethacrylate) ("PMMA"), polystyrene ("PS"), polyvinylchloride ("PVC"), polyethersulfone ("PES"), polypropylene ("PP"), polyamide ("PA"), polyphenylene ether ("m-PPO"), polyoxymethylene ("POM"), polysulfone ("PSU"), polyphenylene sulfide ("PPS"), polyimide ("PI"), polyethyleneimine ("PEI"), polyether ether ketone ("PEEK"), polyamide imide ("PAI"), polyarylate ("PAR"), and thermoplastic polyurethane ("TPU"). The window WD may include a polymer film formed of at least one polymer resin among the polymer resins listed above. Alternatively, the window WD may be a glass substrate. The window WD may have a thickness TO being greater than about 0 µm and equal to or less than about 100 micrometers (µm). The thickness TO of the window WD may be measured in a direction in which a third directional axis DR3 extends.

The window WD may further include a functional layer (not shown). For example, the window WD may further include a hard coating layer, an anti-fingerprint layer, or an anti-scattering layer as a functional layer.

The first adhesive layer AL1 may be disposed below the window WD. The first adhesive layer AL1 may bond the window WD and a member disposed below the window WD. Referring to FIG. 3, the first adhesive layer AL1 of an embodiment may attach the display panel DP to the window WD. Referring to FIG. 4, the first adhesive layer AL1 of an embodiment may bond the polarizing film PO and the window WD. The first adhesive layer AL1 may have a thickness T1 of about 75 µm to about 150 µm. The thickness T1 of the first adhesive layer AL1 may be measured in a direction in which the third directional axis DR3 extends. In the present description, when an element (or a region, a layer, a portion, etc.) is referred to as "bond" other elements, it means that the other elements are fixed to each other with the element disposed therebetween.

FIGS. 3 and 4 illustrate that the first adhesive layer AL1 is provided in the form of a single layer, but the embodiment of the inventive concept is not limited thereto. In another embodiment, for example, the first adhesive layer AL1 may be provided in the form of multiple layers, and the multiple layers composing the first adhesive layer AL1 all may have identical physical properties. Alternatively, the multiple layers composing the first adhesive layer AL1 may differ from each other in physical properties. When the multiple layers composing the first adhesive layer AL1 each have different physical properties, the average value of the different physical properties may satisfy the physical property range of the first adhesive layer AL1 according to an embodiment. When the multiple layers forming the first adhesive layer AL1 each have different storage moduli, the average value of the different storage moduli may satisfy the storage modulus range of the first adhesive layer AL1 according to an embodiment described later. In addition, when the multiple layers composing the first adhesive layer AL1 each have different loss factors, the average value of the different loss factors may satisfy the loss factor range of the first adhesive layer AL1 according to an embodiment which will be described later.

The first adhesive layer AL1 may have a storage modulus of about 0.2 megapascals (MPa) or less at about-20 degrees in Celsius (° C.). In addition, the first adhesive layer AL1 may have the maximum value of a loss factor (tan δ) at a frequency of about 1000 Hertz (Hz) or greater. The loss factor (tan δ) is "a value given by dividing the loss modulus by the storage modulus". The higher the frequency, the greater the loss factor (tan δ), and thus the maximum value of the loss factor (tan δ) may be given at a specific frequency. The loss factor (tan δ) of the adhesive layer may decrease after reaching the maximum value as the frequency increases.

According to an embodiment, the first adhesive layer AL1 may have a storage modulus of about 1.8 MPa to about 4.0 MPa (hereinafter, "predetermined range") at room temperature (e.g., about 20 to about 23° C.). When the window WD includes a polymer film, the first adhesive layer AL1 may have a storage modulus of about 1.8 MPa to about 4.0 MPa at 30000 Hz. When the window WD includes a glass substrate, the first adhesive layer AL1 may have a storage modulus of about 1.8 MPa to about 4.0 MPa at 50000 Hz.

Frequencies at which the predetermined range of the storage modulus of the first adhesive layer AL1 is satisfied may vary according to types of the window WD. The frequencies at which the predetermined range of the storage modulus of the first adhesive layer AL1 is satisfied may be different when the window WD includes a glass substrate from when the window WD includes a polymer film. That is, according to the types of the window WD used in the display devices DD and DD-a, an adhesive layer having a different storage modulus may be used. The frequency (e.g., 50000 Hz) at which the above-described predetermined storage modulus range (e.g., about 1.8 MPa to about 4.0 MPa) of the first adhesive layer AL1 is satisfied when the window WD includes a glass substrate may be higher than the frequency (e.g., 30000 Hz) at which the above-described predetermined storage modulus range (e.g., about 1.8 MPa to about 4.0 MPa) of the first adhesive layer AL1 is satisfied when the window WD includes a polymer film.

In another embodiment, for example, when the window WD includes a polymer film, the first adhesive layer AL1 may have a storage modulus of about 2.0 MPa to about 3.5 MPa at 30000 Hz. Alternately, when the window WD includes a glass substrate, the first adhesive layer AL1 may have a storage modulus of about 2.0 MPa to about 3.0 MPa at 50000 Hz. However, this is presented as an example, and the embodiment of the inventive concept is not limited thereto.

According to an embodiment, the first adhesive layer AL1 may have a loss factor (tan δ) of about 1.5 or greater (hereinafter "predetermined range") at 30000 Hz. When the window WD includes a polymer film, the first adhesive layer AL1 may have a loss factor (tan δ) of about 1.5 or greater at 30000 Hz. For example, the first adhesive layer AL1 disposed below the window WD including the polymer film may have a loss factor (tan δ) of about 1.7 or greater at 30000 Hz. However, this is presented as an example, and the embodiment of the inventive concept is not limited thereto.

In addition, the first adhesive layer AL1 may have a loss factor (tan δ) of about 1.6 or greater at 50000 Hz. When the window WD includes a glass substrate, the first adhesive layer AL1 may have a loss factor (tan δ) of about 1.6 or greater at 50000 Hz. The first adhesive layer AL1 disposed below the window WD including the glass substrate may have a loss factor (tan δ) of about 1.7 or greater at 50000 Hz. However, this is presented as an example, and the embodiment of the inventive concept is not limited thereto. According to the types of the window WD, the frequencies at which the predetermined range of the loss factor (tan δ) of the first adhesive layer AL1 disposed below the window WD is satisfied may vary.

When an impact is applied to a display device from the outside, vibration and heat are generated in an adhesive layer included in the display device, and the adhesive layer may absorb the impact. The adhesive layer disposed on a display panel of the display device absorbs an external impact, and may thus protect the display panel from the external impact. The level of shock absorption of the adhesive layer to the impact applied from the outside of the display device may be different when the window includes a glass substrate from when the window includes a polymer film. When the same intensity of impact is applied to the display device, a window including a glass substrate may transmit a greater impact into the display device than a window including a polymer film.

When the window WD includes a polymer film, vibration frequencies of the first adhesive layer AL1 and the second adhesive layer AL2 may indicate values corresponding to about 1000 Hz to about 30000 Hz. Alternately, when the window WD includes a glass substrate, vibration frequencies of the first adhesive layer AL1 and the second adhesive layer AL2 may indicate values corresponding to about 30000 Hz to about 50000 Hz.

When the same intensity of impact is applied to the window WD included in the display devices DD and DD-a, the intensity of the impact transmitted to the first adhesive layer AL1 may be different when a glass substrate is disposed on the first adhesive layer AL1 from when a polymer film is disposed on the first adhesive layer AL1. The intensity of external force transmitted to the first adhesive layer AL1 may be greater when the window WD includes a glass substrate than when the window WD includes a polymer film. A greater impact may be transmitted to the first adhesive layer AL1 when the glass substrate is disposed on the first adhesive layer AL1 than when the polymer film is disposed on the first adhesive layer AL1. According to the types of the window WD disposed on the first adhesive layer AL1, the vibration frequencies of the first adhesive layer AL1 described above may be different. Accordingly, the ranges of the storage modulus and the loss factor (tan δ) of the first adhesive layer AL1 may indicate physical property ranges for respective frequencies. In the display devices DD and DD-a according to an embodiment, the frequencies at which the predetermined range of storage modulus of the first adhesive layer AL1 is satisfied and the frequencies at which the predetermined range of the loss factor (tan δ) of the first adhesive layer AL1 is satisfied may be different according to the types of the window WD, thereby having improved impact resistance.

Referring to FIG. 4, a polarizing film PO may be disposed below the first adhesive layer AL1. The first adhesive layer AL1 may bond the polarizing film PO and the window WD. The display device DD-a of an embodiment may further include a polarizing film PO disposed on the display panel DP.

The second adhesive layer AL2 may be disposed below the polarizing film PO. The display device DD-a of an embodiment may further include a second adhesive layer AL2 disposed between the polarizing film PO and the display panel DP. The second adhesive layer AL2 may bond the polarizing film PO and the display panel DP.

According to an embodiment, the second adhesive layer AL2 may have a storage modulus of about 0.2 MPa or less at −20° C. In addition, the second adhesive layer AL2 may have the maximum value of the loss factor (tan δ) at a frequency of about 1000 Hz or greater. The second adhesive layer AL2 may have a storage modulus of about 0.8 MPa to about 2.0 MPa, or about 1.8 MPa to about 4.0 MPa at room temperature. The second adhesive layer AL2 may have a storage modulus of about 0.8 MPa to about 2.0 MPa at room temperature. Alternatively, the second adhesive layer AL2 may have a storage modulus of about 1.8 MPa to about 4.0 MPa at room temperature. The frequencies at which a predetermined storage modulus range of each second adhesive layer AL2 is satisfied may vary.

When the window WD includes a polymer film, the second adhesive layer AL2 may have a storage modulus of about 0.8 MPa to about 2.0 MPa at 10000 Hz. Alternately, when the window WD includes a glass substrate, the second adhesive layer AL2 may have a storage modulus of about 1.8 MPa to about 4.0 MPa at 40000 Hz. For example, when the window WD includes a polymer film, the second adhesive layer AL2 may have a storage modulus of about 1.0 MPa to about 1.5 MPa at 10000 Hz. When the window WD includes a glass substrate, the second adhesive layer AL2 may have a storage modulus of about 2.0 MPa to about 4.0 MPa at 40000 Hz.

According to an embodiment, the second adhesive layer AL2 may have a loss factor (tan δ) of about 1.6 or greater at 10000 Hz. Alternatively, the second adhesive layer AL2 may have a loss factor (tan δ) of about 1.5 or greater at 40000 Hz. When the window WD includes a polymer film, the second adhesive layer AL2 may have a loss factor (tan δ) of about 1.6 or greater at 10000 Hz. When the window WD includes a glass substrate, the second adhesive layer AL2 may have a loss factor (tan δ) of about 1.5 or greater at 40000 Hz. For example, the second adhesive layer AL2 disposed below the window WD including the polymer film may have a loss factor (tan δ) of about 1.7 or greater at 10000 Hz. However, this is presented as an example, and the embodiment of the inventive concept is not limited thereto.

Frequencies at which the predetermined range of the storage modulus of the second adhesive layer AL2 is satisfied and frequencies at which the predetermined range of the loss factor (tan δ) of the second adhesive layer AL2 is satisfied may vary according to types of the window WD. The frequencies at which the predetermined range of the storage modulus of the second adhesive layer AL2 is satisfied may be higher when the window WD includes a glass substrate than when the window WD includes a polymer film. The frequencies at which the predetermined range of the loss factor (tan δ) of the second adhesive layer AL2 is satisfied may be higher when the window WD includes a glass substrate than when the window WD includes a polymer film. As described above, according to the types of a window, the level of shock absorption of the adhesive layer to an impact applied from the outside of the display device may vary. Therefore, the vibration frequencies of the second adhesive layer AL2 may vary according to the types of the window WD disposed on the second adhesive layer AL2. Accordingly, the ranges of the storage modulus and loss factor (tan δ) of the second adhesive layer AL2 may indicate physical property ranges for respective frequencies. In the display device DD-a of an embodiment, the frequencies at which the predetermined range of the storage modulus of the second adhesive layer AL2 is satisfied and the frequencies at which the predetermined loss factor (tan δ) of the second adhesive layer AL2 is satisfied vary according to the types of the window WD, thereby having improved impact resistance.

Frequencies at which predetermined ranges of the storage modulus and loss factor (tan δ) of the first adhesive layer AL1 are satisfied may be different from frequencies at which predetermined ranges of the storage modulus and loss factor (tan δ) of the second adhesive layer AL2 are satisfied. The first adhesive layer AL1 may be disposed closer to the window WD than the second adhesive layer AL2. When an impact is applied to the window WD included in the display device DD-a from the outside of the display device DD-a, a greater impact may be transmitted to the first adhesive layer AL1 than the second adhesive layer AL2. Accordingly, the frequencies at which the predetermined ranges of the storage modulus and loss factor (tan δ) of the first adhesive layer AL1 are satisfied may be greater than the frequencies at which the predetermined ranges of the storage modulus and loss factor (tan δ) of the second adhesive layer AL2 are satisfied.

According to an embodiment, the physical properties of the first adhesive layer AL1 disposed below the window WD, and the physical properties of the second adhesive layer AL2 may vary according to types of the window WD. The ranges of the storage modulus and loss factor (tan δ) of the first adhesive layer AL1 may vary. The ranges of the storage modulus and loss factor (tan δ) of the second adhesive layer AL2 may vary. Accordingly, the display devices DD and DD-a including the first adhesive layer AL1 disposed between the window WD and the display panel DP, and the second adhesive layer AL2 may have improved impact resistance.

The first adhesive layer AL1 and the second adhesive layer AL2 each may include a silicone-based resin, an acrylic-based resin, or a urethane-based resin. The first adhesive layer AL1 may be formed by including a polymer resin containing a silicone-based resin, an acrylic-based resin, or a urethane-based resin. The second adhesive layer AL2 may be formed by including a polymer resin containing a silicone-based resin, an acrylic-based resin, or a urethane-based resin. For example, the first adhesive layer AL1 of an embodiment may be formed of an acrylic-based resin. However, this is presented as an example, and the first adhesive layer AL1 and the second adhesive layer AL2 each may include other materials having physical properties satisfying the predetermined ranges of the storage modulus and loss factor (tan δ) described above.

According to an embodiment, the first adhesive layer AL1 and the second adhesive layer AL2 each may further include an adhesion modifier. The adhesion modifier may be a surface modifier. For example, the adhesion modifier may be a low molecular weight material or a silicone-containing material.

In the present description of the inventive concept, the physical properties of the first adhesive layer AL1 and the physical properties (storage modulus, loss factor, etc.) of the second adhesive layer AL2 indicate values measured using a rheometer (TA instruments). Samples for measuring physical properties were prepared by processing each of the first adhesive layer AL1 and the second adhesive layer AL2 into a cylindrical shape having a thickness of about 500 μm. Frequencies or temperature values were changed with a strain of 1 percentage (%) in the rheometer to measure the storage modulus and loss factor (tan δ) of the first adhesive layer AL1, and the storage modulus and loss factor (tan δ) of the second adhesive layer AL2.

Figure 5A:
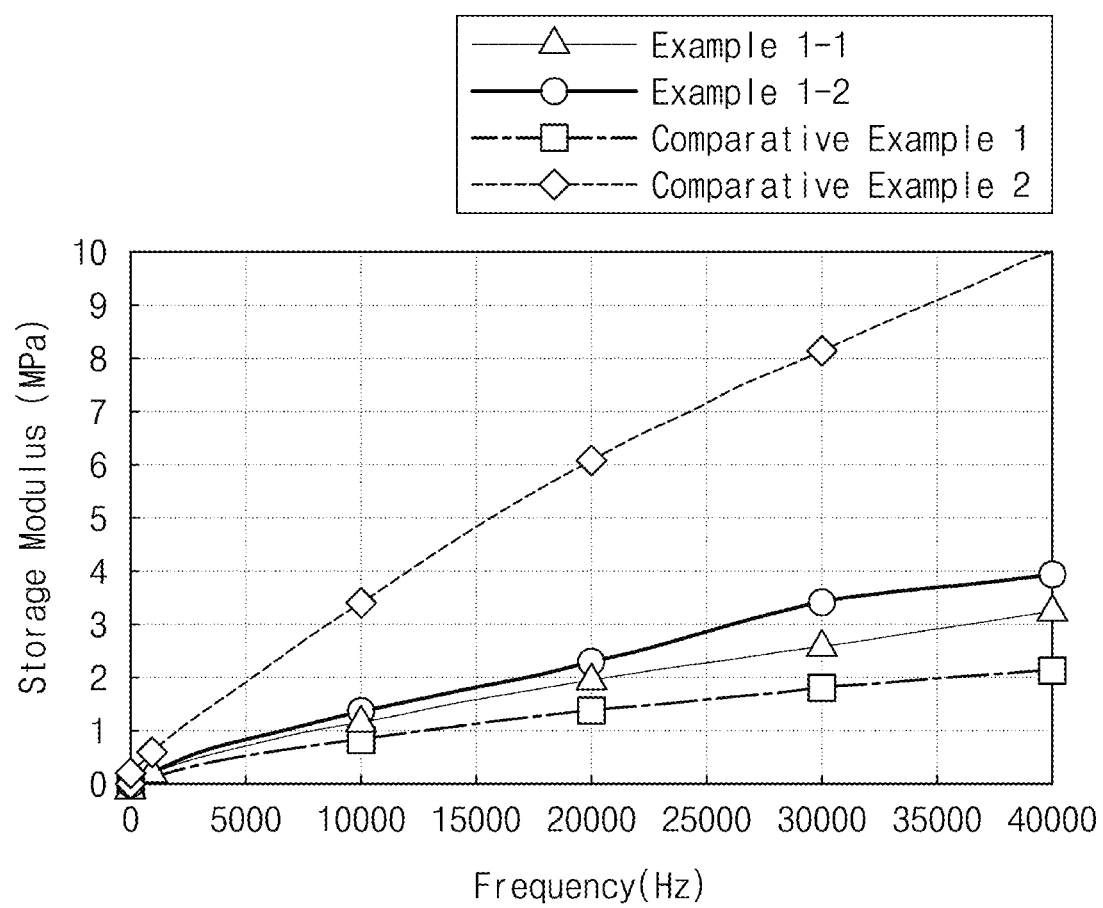
FIG. 5A is a graph showing storage moduli according to frequencies.
Figure 5B:
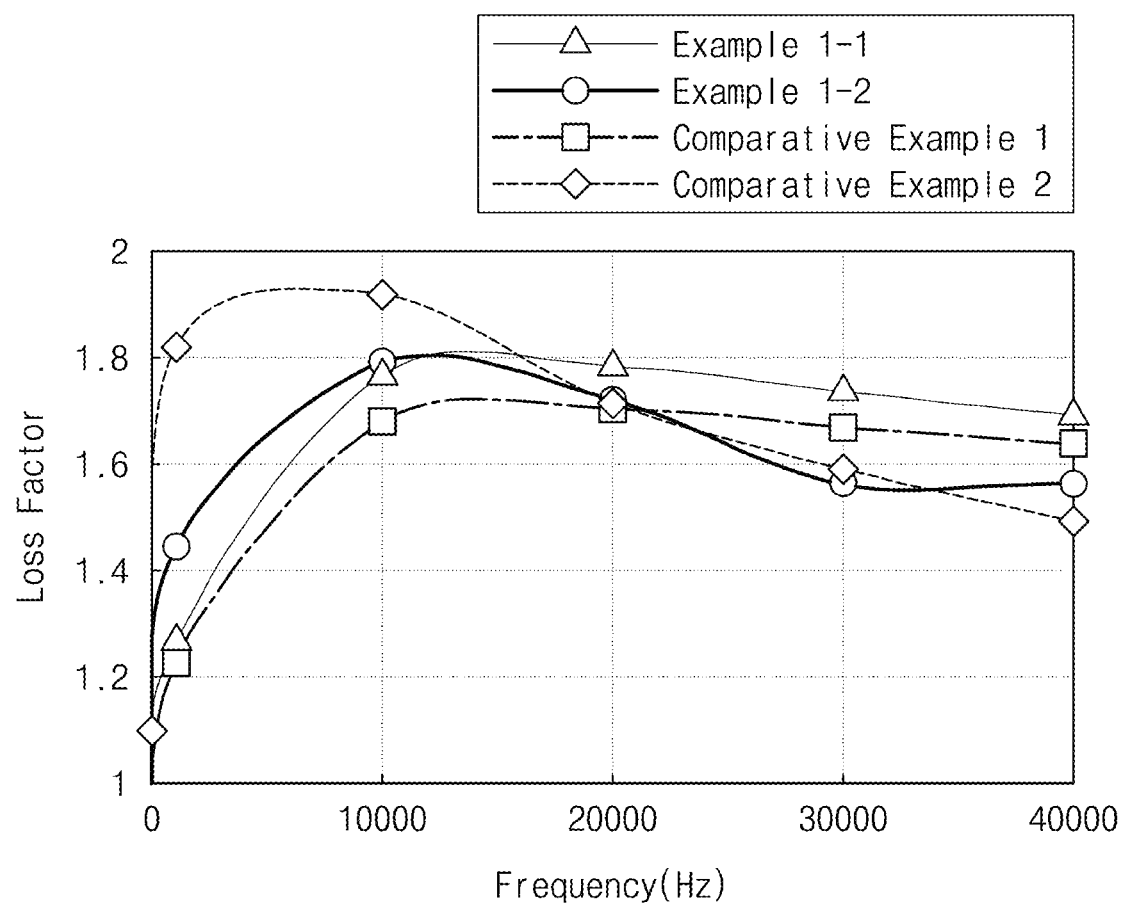
FIG. 5B is a graph showing loss factors according to frequencies.
Figure 6A:
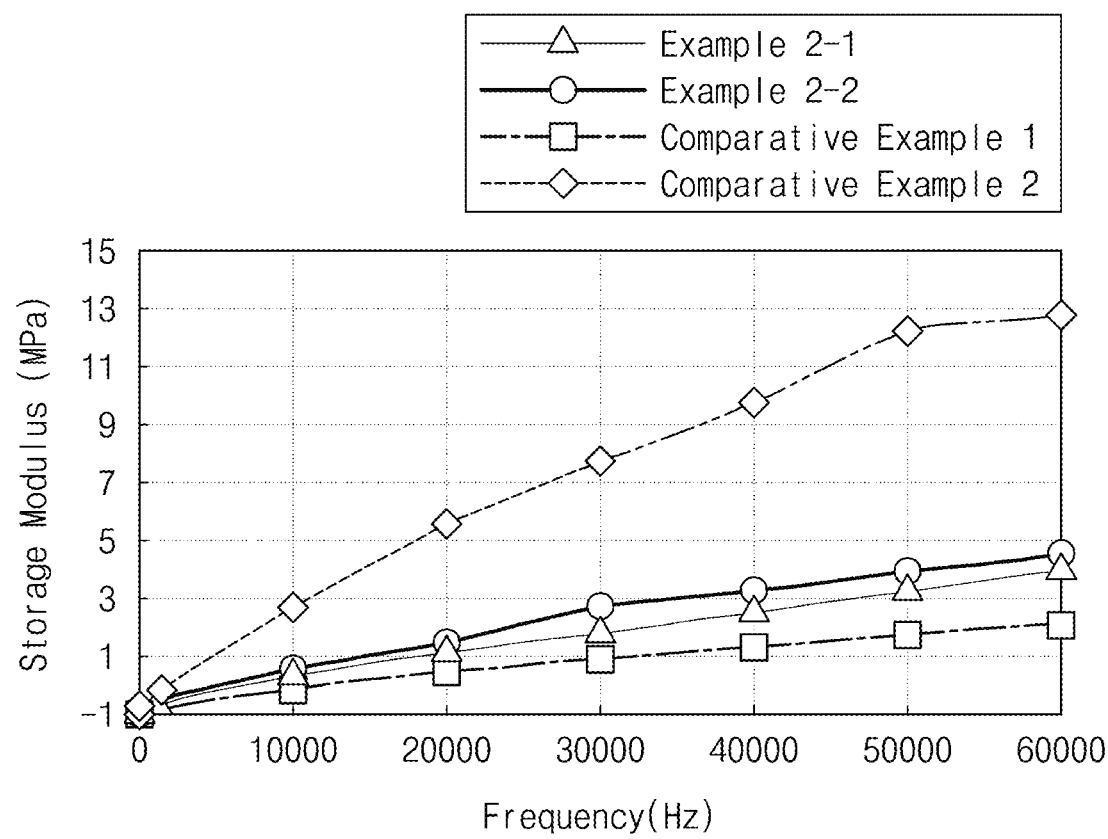
FIG. 6A is a graph showing storage moduli according to frequencies.
Figure 6B:
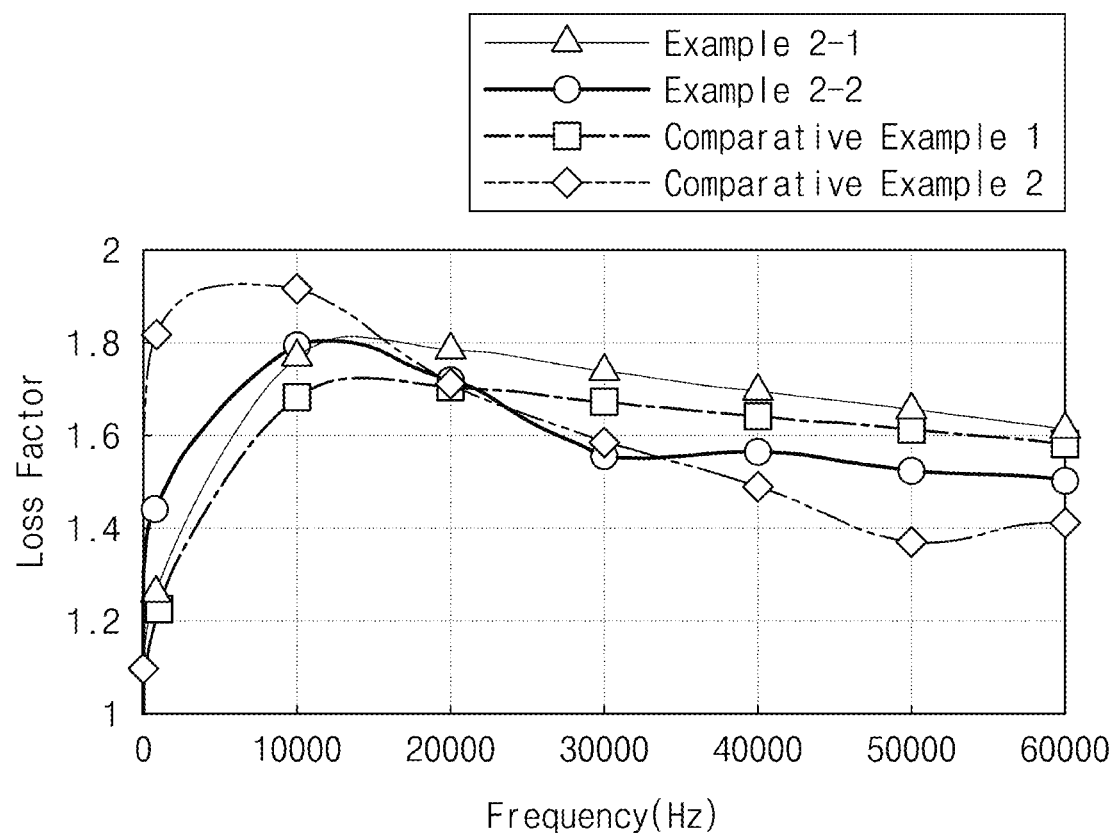
FIG. 6B is a graph showing loss factors according to frequencies.

FIGS. 5A and 6A are graphs showing storage moduli according to frequencies, respectively. FIGS. 5B and 6B are graphs showing loss factors (tan δ) according to frequencies, respectively. FIG. 5A shows a storage modulus of an adhesive layer according to frequencies when a window includes a polymer film. FIG. 5B shows a loss factor (tan δ) of an adhesive layer according to frequencies when a window includes a polymer film. FIG. 6A shows a storage modulus of an adhesive layer according to frequencies when a window includes a glass substrate. FIG. 6B shows a loss factor (tan δ) of an adhesive layer according to frequencies when a window includes a glass substrate. The adhesive layer included in the display device of Example 1-1 and the adhesive layer included in the display device of Example 2-1 each satisfy physical properties of the first adhesive layer AL1 according to an embodiment. The adhesive layers included in the display devices of Examples 1-2 and 2-2 each satisfy physical properties of the second adhesive layer AL2 according to an embodiment. The adhesive layer included in the display device of Comparative Example 1 includes PSA, and may have a storage modulus and a loss factor (tan δ) different from the storage modulus or loss factor (tan δ) of the first adhesive layer and the second adhesive layer according to an embodiment. The adhesive layer included in the display device of Comparative Example 2 includes an optically clear adhesive ("OCA").

Referring to FIG. 5A, the adhesive layer included in the display device of Comparative Example 1 has a storage modulus of about 1.805 MPa at 30000 Hz. The adhesive layer included in the display device of Comparative Example 2 has a storage modulus of about 8.75 MPa at 30000 Hz. The first adhesive layer included in the display device of Example 1-1 has a storage modulus of about 1.8

MPa to about 4.0 MPa at 30000 Hz. The storage modulus range of the first adhesive layer of Example 1-1 at 30000 Hz may lie between the storage modulus of the adhesive layer of Comparative Example 1 at 30000 Hz and the storage modulus of the adhesive layer of Comparative Example 2 at 30000 Hz.

In addition, the adhesive layer of Comparative Example 1 has a storage modulus of about 0.846 MPa at 10000 Hz. The adhesive layer of Comparative Example 2 has a storage modulus of about 3.40 MPa at 10000 Hz. The second adhesive layer of Example 1-2 has a storage modulus of about 0.8 MPa to about 2.0 MPa at 10000 Hz. The storage modulus range of the second adhesive layer of Example 1-2 at 10000 Hz may lie between the storage modulus of the adhesive layer of Comparative Example 1 at 10000 Hz and the storage modulus of the adhesive layer of Comparative Example 2 at 10000 Hz.

In Tables 1 and 2, in each of the display devices of Comparative Examples and Experimental Examples, a window includes a polymer film. Table 1 shows a storage modulus and a loss factor (tan δ) of the adhesive layer included in the display devices of Comparative Examples and Experimental Examples, and shows a storage modulus and a loss factor (tan δ) at 10000 Hz and 30000 Hz, respectively. The adhesive layer included in the display device of Experimental Examples satisfies the predetermined ranges of the storage modulus and loss factor (tan δ) of each of the first adhesive layer and the second adhesive layer of an embodiment. The thicknesses of the adhesive layers included in the display devices of Comparative Examples and Experimental Examples are about 100 μm, respectively. The display device of Comparative Example X1 has the same structure as the display device of Comparative Example 1, and includes an adhesive layer having similar physical properties to the adhesive layer of Comparative Example 1. The display device of Comparative Example X2 has the same structure as the display device of Comparative Example 2, and includes an adhesive layer having similar physical properties to the adhesive layer of Comparative Example 2. Experimental Example A1 and Experimental Example B1 each have the same structure as the display device illustrated in FIG. 4, and the first adhesive layer satisfies the predetermined ranges of the storage modulus and loss factor (tan δ) of the first adhesive layer according to an embodiment, and the second adhesive layer disposed between a polarizing film and a display panel includes a conventional adhesive layer used in a foldable display device. The first adhesive layer of Experimental Example A1 and the first adhesive layer of Experimental Example B1 each have a storage modulus of about 1.8 MPa to about 4.0 MPa at 30000 Hz, and a loss factor (tan δ) of about 1.5 or greater at 30000 Hz. Experimental Example A2 and Experimental Example B2 each have the same structure as the display device illustrated in FIG. 4, and the second adhesive layer satisfies the predetermined ranges of the storage modulus and loss factor (tan δ) of the second adhesive layer according to an embodiment, and the first adhesive layer disposed between a polarizing film and a window includes a conventional adhesive layer used in a foldable display device. The second adhesive layer of Experimental Example A2 and the second adhesive layer of Experimental Example B2 each satisfy the predetermined ranges of the storage modulus and loss factor (tan δ) of the second adhesive layer according to an embodiment. The adhesive layer of Experimental Example A2 and the adhesive layer of Experimental Example B2 each have a storage modulus of about 0.8 MPa to about 2.0 MPa at 10000 Hz, and a loss factor (tan δ) of about 1.6 or greater at 10000 Hz.

Table 2 shows evaluation on impact resistance and folding reliability of the display devices of Comparative Examples and Experimental Examples of Table 1. "Pen drop" and "ball drop" are for evaluating impact resistance. When the same pen or the same ball is dropped on the display device, the height at which a defect in the display device is caused is measured. In addition, in order to evaluate the folding reliability of the display device, folding and unfolding of the display device were repeated 100,000 times at different temperatures or humidity. The folding reliability was evaluated at a low temperature of −20° C., and a high temperature of 60° C. and a humidity of 93%. In Table 2, in the folding reliability evaluation, "NG" indicates the case where an adhesive layer is detached or deformed, and "OK" indicates the case where an adhesive layer stays the same without being detached or deformed.

TABLE 1

| Item | Comparative Example X1 | Comparative Example X2 | Experimental Example A1 | Experimental Example B1 | Experimental Example A2 | Experimental Example B2 |
|---|---|---|---|---|---|---|
| 10000 Hz storage modulus | 0.8403 | 3.4055 | — | — | 1.3749 | 1.1996 |
| 10000 Hz loss factor | 1.6858 | 1.9212 | — | — | 1.7967 | 1.7750 |
| 30000 Hz storage modulus | 1.7856 | 8.1264 | 2.6045 | 3.4382 | — | — |
| 30000 Hz loss factor | 1.6754 | 1.5926 | 1.7434 | 1.5665 | — | — |

TABLE 2

| Item | Comparative Example X1 | Comparative Example X2 | Experimental Example A1 | Experimental Example B1 | Experimental Example A2 | Experimental Example B2 |
|---|---|---|---|---|---|---|
| Pen drop | 3 cm | 4 cm | 5 cm | 6 cm | 5 cm | 6 cm |
| Ball drop | 4 cm | 6 cm | 9 cm | 10 cm | 9 cm | 9 cm |
| −20° C. | OK | NG | OK | OK | OK | OK |
| 60° C., 93% | OK | OK | OK | OK | OK | OK |

Referring to Tables 1 and 2, it is seen that the adhesive layers included in the display devices of Experimental Examples have improved pen drop height and ball drop height, and satisfactory folding reliability compared to the adhesive layers included in the display devices of Comparative Examples. It is seen that in the pen drop height and the ball drop height, the adhesive layer included in the display device of Comparative Example X2 and the adhesive layers included in the display devices of Experimental Examples have improved values compared to the adhesive layer included in the display device of Comparative Example X1. In addition, it is seen that the display device of Comparative Example X1 and the display devices of Experimental Examples have satisfactory reliability in terms of the folding reliability at low temperature, and at high temperature and humidity. It is seen that the adhesive layer included in the display device of Comparative Example X2 has a greater storage modulus than the adhesive layers included in the display devices of Comparative Example X1 and Experimental Examples, and thus the greater storage modulus caused poor reliability in the folding reliability evaluation. Accordingly, it is expected that the display device including an adhesive layer satisfying the predetermined ranges of the storage modulus and loss factor (tan δ) of the first adhesive layer and the second adhesive layer according to an embodiment has improved impact resistance and satisfactory folding reliability.

Referring to FIG. 6A, the adhesive layer included in the display device of Comparative Example 1 has a storage modulus of about 1.805 MPa at 50000 Hz. The adhesive layer included in the display device of Comparative Example 2 has a storage modulus of about 12.38 MPa at 50000 Hz. The first adhesive layer included in the display device of Example 2-1 has a storage modulus of about 1.8 MPa to about 4.0 MPa at 50000 Hz. The storage modulus range of the first adhesive layer of Example 1-1 at 50000 Hz may lie between the storage modulus of the adhesive layer of Comparative Example 1 at 50000 Hz and the storage modulus of the adhesive layer of Comparative Example 2 at 50000 Hz.

In addition, the adhesive layer of Comparative Example 1 has a storage modulus of about 0.84 MPa at 40000 Hz. The adhesive layer of Comparative Example 2 has a storage modulus of about 8.75 MPa at 40000 Hz. The second adhesive layer of Example 1-2 has a storage modulus of about 1.8 MPa to about 4.0 MPa at 40000 Hz. The storage modulus range of the second adhesive layer of Example 1-2 at 40000 Hz may lie between the storage modulus of the adhesive layer of Comparative Example 1 at 40000 Hz and the storage modulus of the adhesive layer of Comparative Example 2 at 40000 Hz.

In Tables 3 and 4, in each of the display devices of Comparative Examples and Experimental Examples, a window includes a glass substrate. Table 3 shows the storage modulus and loss factor (tan δ) of the adhesive layer included in the display devices of Comparative Examples and Experimental Examples, and shows the storage modulus and loss factor (tan δ) at 40000 Hz and 50000 Hz, respectively. The adhesive layer included in the display device of Experimental Examples satisfies the predetermined ranges of the storage modulus and loss factor (tan δ) of each of the first adhesive layer and the second adhesive layer according to an embodiment. The thicknesses of the adhesive layers included in the display devices of Comparative Examples and Experimental Examples are about 100 μm, respectively. The display device of Comparative Example Y1 has the same structure as the display device of Comparative Example 1, and includes an adhesive layer having similar physical properties to the adhesive layer of Comparative Example 1. The display device of Comparative Example Y2 has the same structure as the display device of Comparative Example 2, and includes an adhesive layer having similar physical properties to the adhesive layer of Comparative Example 2. Experimental Example C1 and Experimental Example D1 each have the same structure as the display device illustrated in FIG. 4, and the first adhesive layer satisfies the predetermined ranges of the storage modulus and loss factor (tan δ) of the first adhesive layer according to an embodiment, and the second adhesive layer disposed between a polarizing film and a display panel includes a conventional adhesive layer used in a foldable display device. The first adhesive layer of Experimental Example C1 and the first adhesive layer of Experimental Example D1 each have a storage modulus of about 1.8 MPa to about 4.0 MPa at 50000 Hz, and a loss factor (tan δ) of about 1.6 or greater. The display device of Experimental Example C2 and the display device of Experimental Example D2 each have the same structure as the display device illustrated in FIG. 4, and the second adhesive layer satisfies the predetermined ranges of the storage modulus and loss factor (tan δ) of the second adhesive layer according to an embodiment, and the first adhesive layer includes a conventional adhesive layer used in a foldable display device. The second adhesive layer of Experimental Example C2 and the second adhesive layer of Experimental Example D2 each have a storage modulus of about 1.8 MPa to about 4.0 MPa at 40000 Hz, and a loss factor (tan δ) of about 1.5 or greater.

Table 4 shows evaluation on impact resistance and folding reliability of the display devices of Comparative Examples and Experimental Examples of Table 3. "Pen drop" and "ball drop" are for evaluating impact resistance. When the same pen or the same ball is dropped on the display device, the height at which a defect in the display device is caused is measured. In addition, in order to evaluate the folding reliability of the display device, folding and unfolding of the display device were repeated 100,000 times at different temperatures or humidity. The folding reliability was evaluated at a low temperature of −20° C., and at a high temperature of 60° C. and a humidity of 93%. In Table 4, in the folding reliability evaluation, "NG" indicates the case where an adhesive layer is detached or deformed, and "OK" indicates the case where an adhesive layer stays the same without being detached or deformed.

TABLE 3

| Item | Comparative Example Y1 | Comparative Example Y2 | Experimental Example C1 | Experimental Example D1 | Experimental Example C2 | Experimental Example D2 |
|---|---|---|---|---|---|---|
| 40000 Hz storage modulus | 3.4382 | 8.1264 | — | — | 3.9432 | 2.1642 |
| 40000 Hz loss factor | 1.5665 | 1.5926 | — | — | 1.5701 | 1.6450 |
| 50000 Hz storage modulus | 4.5880 | 12.3764 | 2.5610 | 2.3725 | — | — |
| 50000 Hz loss factor | 1.5283 | 1.3719 | 1.6164 | 1.71 | — | — |

TABLE 4

| Item | Comparative Example X1 | Comparative Example X2 | Experimental Example A1 | Experimental Example B1 | Experimental Example A2 | Experimental Example B2 |
|---|---|---|---|---|---|---|
| Pen drop | 4 cm | 7 cm | 13 cm | 12 cm | 10 cm | 10 cm |
| Ball drop | 6 cm | 10 cm | 19 cm | 18 cm | 19 cm | 18 cm |
| −20° C. | OK | NG | OK | OK | OK | OK |
| 60° C., 93% | OK | OK | OK | OK | OK | OK |

Referring to Tables 3 and 4, it is seen that the adhesive layers included in the display devices of Experimental Examples have improved pen drop height and ball drop height, and satisfactory folding reliability compared to the adhesive layers included in the display devices of Comparative Examples. It is seen that in the pen drop height and the ball drop height, the adhesive layer included in the display device of Comparative Example Y2 and the adhesive layers included in the display devices of Experimental Examples have improved values compared to the adhesive layer included in the display device of Comparative Example Y1. In addition, it is seen that the display device of Comparative Example Y1 and the display devices of Experimental Examples have satisfactory reliability in terms of the folding reliability at low temperature, and at high temperature and humidity. It is seen that the adhesive layer included in the display device of Comparative Example Y2 has a greater storage modulus than the adhesive layers included in the display devices of Comparative Example Y1 and Experimental Examples, and thus the greater storage modulus caused poor reliability in the folding reliability evaluation. Accordingly, it is expected that the display device including an adhesive layer satisfying the predetermined ranges of the storage modulus and loss factor (tan δ) of the first adhesive layer and the second adhesive layer according to an embodiment has improved impact resistance and satisfactory folding reliability.

The display device of an embodiment includes one or more adhesive layers between a window and a display panel, and the ranges of the storage modulus and loss factor (tan δ) of the adhesive layers may vary according to types of the window. When the window includes a polymer film, frequencies at which the predetermined ranges of the storage modulus and loss factor (tan δ) of the adhesive layer are satisfied may be 30000 Hz or 10000 Hz. Alternately, when the window includes a glass substrate, frequencies at which the predetermined ranges of the storage modulus and loss factor (tan δ) of the adhesive layer are satisfied may be 50000 Hz or 40000 Hz. According to the types of the window, the ranges of the storage modulus and loss factor (tan δ) of the adhesive layer may vary. According to the types of the window, the display device of an embodiment may have different storage modulus and loss factor ranges of the adhesive layer to exhibit improved impact resistance. In addition, satisfactory reliability may be obtained against repeated folding and unfolding of the display device.

An embodiment includes an adhesive layer disposed between a display panel and a window, and may thus keep reliability against repeated folding and unfolding, and provide a display device having improved impact resistance.

What is claimed is:

1. A display device comprising:
   a display panel which is foldable with respect to at least one folding axis;
   a window disposed on the display panel; and
   a first adhesive layer disposed between the display panel and the window, attached to the window, and including silicone-based resin, acrylic-based resin, or urethane-based resin,
   wherein the window comprises one of a polymer film and a glass substrate,
   wherein the first adhesive layer has a storage modulus of about 1.8 megapascals (MPa) to about 4.0 MPa at room temperature and 30000 Hertz (Hz) when the window comprises the polymer film,
   wherein the first adhesive layer has the storage modulus of about 1.8 megapascals (MPa) to about 4.0 MPa at room temperature and 50000 Hz when the window comprises the glass substrate, and
   the polymer film comprises at least one polymer resin selected from the group consisting of polybutylene terephthalate, polyvinyl chloride, polypropylene, polyamide, polyphenylene ether, polyoxymethylene, polysulfone, polyethyleneimine, polyether ether ketone, polyamide imide, and thermoplastic polyurethane.

2. The display device of claim 1, wherein when the window comprises the glass substrate,
   a loss factor (tan δ) of the first adhesive layer at 50000 Hz is about 1.6 or greater.

3. The display device of claim 1, further comprising:
a polarizing film disposed between the first adhesive layer and the display panel; and
a second adhesive layer having a storage modulus of about 0.2 MPa or less at −20° C. and disposed between the polarizing film and the display panel at any frequency.

4. The display device of claim 3, wherein when the window comprises the glass substrate,
the second adhesive layer has a storage modulus of about 1.8 MPa to about 4.0 MPa at 40000 Hz.

5. The display device of claim 3, wherein when the window comprises the glass substrate,
a loss factor (tan δ) of the second adhesive layer at 40000 Hz is about 1.5 or greater.

6. The display device of claim 1, wherein the first adhesive layer has a thickness of about 75 micrometers (μm) to about 150 μm.

7. The display device of claim 1, wherein the window has a thickness being greater than about 0 μm and equal to or less than about 100 μm.

8. The display device of claim 1, wherein the display panel and the window are foldable to have a radius of curvature of about 1 millimeters (mm) to about 5 mm with respect to the at least one folding axis.

9. The display device of claim 1, the display device is a personal digital terminal, a tablet, a car navigation unit, a game console, or a wearable device.

\* \* \* \* \*